(12) United States Patent
Diesta et al.

(10) Patent No.: US 12,283,914 B2
(45) Date of Patent: Apr. 22, 2025

(54) COST EFFECTIVE FRAME DESIGN FOR THINNER WAFERS

(71) Applicant: REC SOLAR PTE. LTD., Singapore (SG)

(72) Inventors: Noel G. Diesta, Singapore (SG); Shankar Gauri Sridhara, Singapore (SG)

(73) Assignee: REC SOLAR PTE. LTD., Singapore (SG)

( * ) Notice: Subject to any disclaimer, the term of this patent is extended or adjusted under 35 U.S.C. 154(b) by 0 days.

(21) Appl. No.: 18/327,407

(22) Filed: Jun. 1, 2023

(65) Prior Publication Data

US 2023/0318526 A1 Oct. 5, 2023

Related U.S. Application Data

(63) Continuation of application No. 16/618,661, filed as application No. PCT/IB2018/053933 on Jun. 1, 2018, now Pat. No. 11,671,051.

(30) Foreign Application Priority Data

Jun. 1, 2017 (GB) ...................................... 1708735

(51) Int. Cl.
H02S 30/10 (2014.01)
H02S 40/34 (2014.01)

(52) U.S. Cl.
CPC .............. *H02S 30/10* (2014.12); *H02S 40/34* (2014.12)

(58) Field of Classification Search
CPC ....... H01L 31/00–078; Y02E 10/50–60; H02S 30/10

(Continued)

(56) References Cited

U.S. PATENT DOCUMENTS

| 2011/0120533 A1 | 5/2011 | Terunuma et al. |
| 2011/0226335 A1 | 9/2011 | Naitoh et al. |

(Continued)

FOREIGN PATENT DOCUMENTS

| CN | 202839681 U | 3/2013 |
| CN | 103329283 A | 9/2013 |

(Continued)

OTHER PUBLICATIONS

JP-2011249508-A English (Year: 2011).*

(Continued)

*Primary Examiner* — Bach T Dinh
(74) *Attorney, Agent, or Firm* — Lee & Hayes, P.C.

(57) ABSTRACT

A slim solar module is proposed. It comprises a solar laminate comprising plural solar cells interposed between front and rear cover sheets, a frame enclosing the solar laminate and at least one reinforcement strut arranged at a rear surface of the solar laminate. A ratio between a frame surface and a frame thickness shall be between 45000 and 70000. For example, the frame may have a thickness of less than 35 mm. Specifically, the frame may have a length of 1665 mm, a width of 991 mm and a thickness of 30 mm. Due to the reduced thickness, the solar module has a reduced volume being beneficial during transport to a destination location. However, the thickness has been optimized to, with the reinforcement struts, still providing for sufficient mechanical stability for the solar module.

18 Claims, 7 Drawing Sheets

(58) Field of Classification Search
USPC .................................................. 136/243–265
See application file for complete search history.

(56) References Cited

U.S. PATENT DOCUMENTS

| | | | |
|---|---|---|---|
| 2011/0232728 A1 | 9/2011 | Mun | |
| 2012/0279560 A1 | 11/2012 | Sumida et al. | |
| 2013/0213458 A1 | 8/2013 | Tsujimoto et al. | |
| 2015/0068589 A1 | 3/2015 | Sueda et al. | |
| 2017/0040928 A1 | 2/2017 | Schuit et al. | |
| 2020/0313605 A1 | 10/2020 | Diesta et al. | |

FOREIGN PATENT DOCUMENTS

| | | | | |
|---|---|---|---|---|
| CN | 204316424 U | | 5/2015 | |
| CN | 204707074 | | 10/2015 | |
| CN | 206098409 U | | 4/2017 | |
| DE | 102014105052 A1 | | 10/2014 | |
| EP | 2157620 | | 2/2010 | |
| EP | 2312647 | | 4/2011 | |
| EP | 2672524 | | 11/2013 | |
| JP | H10294485 A | | 11/1998 | |
| JP | 2008255707 A | | 10/2008 | |
| JP | 2011249508 A | * | 12/2011 | |
| JP | 2013055122 A | * | 3/2013 | ............. H02S 30/10 |
| JP | 2013527991 A | | 7/2013 | |
| JP | 2014088665 A | | 5/2014 | |
| JP | 2016192853 A | | 11/2016 | |
| JP | 2017028871 | | 2/2017 | |
| TW | M491144 U | | 12/2014 | |
| TW | M525026 U | | 7/2016 | |
| WO | WO2012163908 | | 12/2012 | |
| WO | WO2013031693 | | 7/2013 | |

OTHER PUBLICATIONS

JP-2013055122-A English (Year: 2013).*
JP2014088665 English (Year: 2014).*
DE102014105052A1 English Translation, 2014, 11 pgs.
WO2012163908 English Translation, 2012, 28 pgs.
Australian Office Action mailed Jul. 12, 2022 in Australian Application No. 2018277261 a foreign corresponding application of U.S. Appl. No. 16/618,661, 2 pages.
Chinese Office Action mailed Aug. 12, 2022 in Chinese Application No. 201880048412.9 a foreign corresponding application of U.S. Appl. No. 16/618,661, 9 pages.
Great Britain Combined Search and Examination Report from GB1708735.4, mailed Oct. 18, 2017, 7 pages.
European Office Action mailed Mar. 3, 2022 in Europe Application No. 18735703.3, a foreign correspondign application of U.S. Appl. No. 16/618,661, 5 pages.
Indian Office Action mailed Feb. 23, 2022 in India Application No. 20197054094, a foreign correspondign application of U.S. Appl. No. 16/618,661, 5 pages.
International Search Report and Written Opinion from PCT/IB2018/053933 mailed Aug. 23, 2018, 9 pages.
Japanese Office Action mailed Apr. 5, 2022 in Japan Application No. 2019-566584, a foreign correspondign application of U.S. Appl. No. 16/618,661, 12 pages. Translated.
Lesic et al., "The First Photovoltaic System Connected to Distribution Network in Bosnia and Herzegovina," Jun. 6, 2013. Proceedings of 2013 4th International Youth Conference on Energy (IYCE) IEEE. 9 pages.
US Office Action for U.S. Appl. No. 16/618,661, mailed on Jan. 7, 2022, Diesta, "Cost Effective Frame Design for Thinner Wafers", 11 Pages.
US Office Action for U.S. Appl. No. 16/618,661, mailed on Mar. 23, 2021, Diesta, "Cost Effective Frame Design for Thinner Wafers", 13 pages.
US Office Action for U.S. Appl. No. 16/618,661, mailed on Aug. 8, 2022, Diesta, "Cost Effective Frame Design for Thinner Wafers", 29 Pages.
Singapore Office Action mailed Dec. 24, 2020 in Singapore Application No. 11201911489Y, a foreign correspondign application of U.S. Appl. No. 16/618,661, 6 pages.
Singapore Office Action mailed Apr. 7, 2022 in Singapore Application No. 11201911489Y, a foreign correspondign application of U.S. Appl. No. 16/618,661, 6 pages.
Singapore Office Action mailed Aug. 23, 2021 in Singapore Application No. 11201911489Y, a foreign correspondign application of U.S. Appl. No. 16/618,661, 6 pages.
Taiwan Office Action mailed Jan. 6, 2022 in Taiwan Application No. 107115585 a foreign correspondign application of U.S. Appl. No. 16/618,661, 11 pages.

* cited by examiner

COST EFFECTIVE FRAME DESIGN FOR THINNER WAFERS

CROSS-REFERENCE TO RELATED APPLICATIONS

This application is a continuation of U.S. application Ser. No. 16/618,661 filed Dec. 2, 2019, which is a 371 National Phase application of International Application No. PCT/IB2018/053933, filed Jun. 1, 2018, which claims priority to UK Patent Application No. 1708735.4, filed Jun. 1, 2017. The entireties of both applications are incorporated herein by reference.

FIELD OF THE INVENTION

The present invention relates to a solar module.

TECHNICAL BACKGROUND

Solar cells are photovoltaic devices adapted to convert sunlight into electricity by a photovoltaic effect. Generally, a multiplicity of solar cells is electrically interconnected in series and/or in parallel in order to form strings of solar cells. Such strings are then included in a laminate (which, in some prior publications and in the priority application to the present patent application, is also referred to as a "superstrate") in which a transparent front cover sheet and a rear cover sheet include the string interposed in between both cover sheets. For example, the front cover sheet may comprise a glass sheet and an encapsulant such as a layer of EVA (Ethylene Vinyl Acetate) or of another encapsulating material and may be highly optically transparent such that sunlight may be effectively be transmitted to the solar cells. The rear cover sheet may be of similar construction as the front cover sheet, i.e. may be transparent, or may be provided with a non-transparent construction such as a metal sheet. The laminate may protect the solar cell string against both, mechanical as well as chemical influences. The laminate is typically enclosed by a frame, mainly for reasons of increasing the mechanical stability.

Conventionally, solar modules have been designed such as to fulfil high mechanical requirements and/or longevity requirements and/or manufacturing cost requirements. Accordingly, a geometry, a construction and/or solar module components have been selected and designed such as to comply with such requirements.

SUMMARY OF THE INVENTION

There may be a need for an improved solar module enabling low overall system costs while fulfilling, inter alia, further requirements such as superior mechanical stability and/or high longevity.

Such need may be met with a solar module according to the independent claim. Advantageous embodiments are defined in the dependent claims and in the specification.

According to an aspect of the present invention, a solar module comprising a solar laminate, a frame and at least one reinforcement strut is proposed. The solar laminate comprises a plurality of solar cells interposed between a transparent front cover sheet and a rear cover sheet. The frame encloses the solar laminate at lateral edges of the solar laminate. The frame has a frame surface and a frame thickness, the frame surface being defined by a length of the frame multiplied by a width of the frame. The reinforcement strut is arranged at a rear surface of the solar laminate between opposing portions of the frame. Therein a ratio between the frame surface and the frame thickness is between 45000 and 70000, preferably between 50000 and 70000 and more preferably between 53000 and 67000 or between 53000 and 60000, with dimensions of the frame being measured in millimetres.

Principles relating to embodiments of the present invention may be understood as being based, inter alia and without restricting a scope of the invention, on the following ideas and recognitions:

As briefly indicated above, solar modules have conventionally been optimized mainly with respect to mechanical requirements and/or longevity requirements and/or manufacturing cost requirements. In other words, the components of a solar module have been selected and designed such that the solar module can withstand typical forces acting onto it and protect the fragile solar cells over at least 20 years. Additionally, components may have been selected such as to reduce component costs.

However, with the overall production costs for solar modules having significantly decreased over the years, other influences on overall system costs have become more and more influencing. For example, it has been found that in the overall system costs, i.e. the total costs including costs for producing a solar module as well as costs for installing the solar module at a destination location, costs for transporting the solar modules to the destination location make up an steadily increasing contribution.

Accordingly, as such transportation costs, such as shipping costs, are mainly determined by a volume to be transported, it has been found that overall system costs may be reduced by reducing the volume of the solar modules. Such volume is determined by a surface and a thickness of the solar module. However, on the one hand, the area of the surface of a solar module may of course not be reduced as this surface directly correlates with the sun light power which may be collected by the solar module. On the other hand, while the thickness of the solar module could be reduced without reducing power generation of the module, such reducing of the thickness generally reduces the mechanical stability of the solar module.

Accordingly, a compromise had to be found which both, reduces a volume of the solar module compared to conventional solar modules and which nevertheless may guarantee sufficient mechanical robustness for achieving a satisfying longevity.

In order to determine such compromise, the inventors of the present invention have found that an optimisation of the module regarding its geometry, structure and mechanical characteristics has to be performed wherein various parameters have to be taken into account as influencing the optimisation result. In such optimisation, various influencing values and determining parameters may be taken into account, such as, inter alia:

dimensions and geometries of various module components, e.g. a thickness of profiles and struts forming the frame, a thickness of the laminate, etc;

mechanical characteristics of materials used in various module components;

relative positionings of various module components with respect to each other;

acceptable limits for deformation and/or degradation of the solar module upon mechanical loading;

etc.

The optimisation procedure may comprise experiments using components of the solar module and/or using the entire solar module with regard to mechanical behaviour of components or the entire solar module upon mechanical loading;

computer-based modelling and/or simulation regarding components of the solar module and/or regarding the entire solar module, including e.g. FEM-analysis and/or multi-dimensional simulation of a mechanical behaviour of components or the entire solar module upon mechanical loading;

experiences from earlier in-field applications of solar modules;

etc.

For example, experiments and/or modelling/simulation may assume that a pressure load is acting onto the solar module. In reality, such pressure load may result e.g. from wind, snow, etc. acting onto the solar module. A behaviour of the solar module upon being subjected to such load may then be analysed. For example, the pressure load typically results in some deformation of the solar module, combined with some deflection of the laminate. As a result of such deformation and deflection, the laminate and particularly its solar cells may degrade e.g. due to partial breakage. As a final result, the module output may degrade. Generally, it is assumed that a maximum degradation of 5% is acceptable, as defined for example under the IEC61215 standard.

The above mentioned compromise is found with the solar module according to the above aspect of the invention. Therein, on the one hand, the solar module comprises at least one reinforcements strut. Such strut is configured and arranged such as to improve the solar module's stability, particularly its stiffness. On the other hand, the thickness of the frame of the solar module is optimized. It has been found that with a ratio of between 45000 and 70000, preferably between 53000 and 60000, between the frame surface and the frame thickness (measured in mm), an optimum appears to be feasible in which the solar module has a small volume while still being stable enough.

It shall be mentioned that, herein, the term "frame surface" may be understood as a surface enclosed by an outer contour of the module's frame and may also be referred to as module surface or module area.

According to an embodiment, the frame may have a thickness of less than 35 mm, preferably less than 33 mm or even less than 31 mm. For example, the thickness may be between 28 mm and 31 mm, or more specifically, the thickness may be substantially 30 mm.

According to a specific embodiment, the frame has a length, i.e. a dimension measured in a longitudinal direction of the module, of 1665±x mm, a width, i.e. a dimension measured in a transversal direction of the module, of 991±y mm and a thickness of 30±z mm, with x, y, z being tolerances with x<5 mm, y<5 mm and z<2 mm, preferably x<3 mm, y<3 mm and z<1 mm.

Particularly, the solar module may have length and width dimensions which are same or similar to those of conventional solar modules. However, while the thickness of such conventional solar modules is typically 38 mm or more, the solar module proposed herein may have a substantially lower thickness of between 28 and 32 mm, preferably of 30 mm. Such thinner modules have been found to still exhibit a sufficient mechanical stability, particularly when being reinforced with one or preferably more struts supporting the circumferential frame in providing such stability. On the other hand, a volume of such solar modules may be reduced by about 30% when compared to conventional solar modules, thereby, inter alia, enabling significantly reducing transporting costs.

According to an embodiment, the front cover sheet comprises a glass sheet with a thickness of between 2.7 mm and 3.1 mm, preferably with a thickness of between 2.8 mm and 3.05 mm, more preferably with a thickness of 2.8 mm or with a thickness of 3.05 mm.

It has been found that, while conventional solar modules are typically provided with a front cover sheet having a glass sheet with a thickness of 3.2 mm or more, a glass sheet thickness of between 2.7 and 3.1 mm, or preferably of 2.8 mm or 3.05 mm, appears to be sufficient for providing for a required mechanical stability of the front cover such as to withstand e.g. hail, wind loads, etc.

By such reducing the thickness of the glass sheet of the front cover, not only its volume but also its weight may be significantly reduced without excessively impairing the mechanical integrity of the solar module. Furthermore, costs for the glass sheet may be reduced, such costs significantly contributing to overall component costs of modern solar modules.

According to an embodiment, the reinforcement strut is electrically connected to the frame.

Due to such electrical connection, any electrically charging of the struts may be avoided as the frame of the solar module is typically electrically grounded. This may be particularly important in cases where the struts is made with an electrically conductive material such as a metal.

According to an embodiment, the solar module further comprises a spacer element cooperating with the frame such as to push the reinforcement strut in a direction towards the laminate.

Generally, the strut shall support the stability of the solar module. Particularly, the strut may support the laminate at its rear side. For such purpose, the strut may adjoin the laminate's rear side and may be pressed against this rear side by the spacer. Therein, on the one side, the spacer element (or briefly "spacer") may be fixed to and/or pressed by the frame. On the other hand, the spacer may be fixed at and/or push the strut in a direction against the rear side of the laminate.

According to an embodiment, the frame comprises elongate hollow profiles. Each of these hollow profiles comprises a first flange and a second flange. The first flange extends from an upper part of the hollow profile thereby forming a clamping portion for clamping the laminate between the first flange and the hollow profile. The second flange extends from a lower part of the hollow profile in a direction towards a centre of the frame.

In other words, the frame may be composed of a plurality of hollow profiles which may be assembled such as together forming the frame. Each profile may have a linear extension and may have walls enclosing an interior volume of the hollow profile. Typically, the hollow profiles may have a rectangular or quasi-rectangular cross section.

From the walls of the hollow profile, the first flange may protrude from the upper part of the profile in a manner e.g. such that a cantilever part of the first flange extends in parallel to an upper wall of the hollow profile. In such configuration, the laminate may be clamped with its outer edge regions between the first flange and the upper wall of the hollow profile.

Furthermore, the second flange may protrude from the lower part of the profile in a direction towards the centre of the frame. Accordingly, the second flange may extend substantially in parallel to the laminate being clamped in the clamping portion of the first flange. The second flange may serve as a counter bearing for pressing the strut(s) in a direction against the rear side surface of the laminate.

For example, according to an embodiment, ends of the reinforcement strut may be interposed between the laminate and the second flange of the frame.

In other words, the laminate may be clamped between an upper wall of the frame's hollow profiles and their first flange whereas the second flange protruding from the lower portion of the hollow profile is significantly spaced apart from the laminate. In such configuration, the struts may be interposed between the laminate and the second flanges of the frame. Suitable spacers may then be fixed to the frame or cooperate with the frame such as to press the strut in a direction towards the laminate.

For example, according to an embodiment, a spacer element may be interposed between an end of the reinforcement strut and the second flange of the frame. The spacer element may serve for establishing an electrical contact between the reinforcement strut and the frame. Furthermore, the spacer element may serve for pressing the strut against the rear side of the laminate.

Accordingly, upon assembling the solar module, the frame may first be assembled by pressing its plural hollow profiles with their first flanges onto the laminate's edge regions such as to be clamped at these laminate's edge regions. Additionally, neighbouring hollow profiles may be mechanically connected to each other at their ends with corner keys. Upon having assembled the frame, the one or more struts may be interposed with their ends between the laminate and a portion of the second flanges of the frame protruding towards the centre of the solar module. However, between the struts and the second flanges, there should typically be a gap as otherwise the strut could hinder correct assembly of the frame. In order to close such gap, a spacer may be interposed between one of the second flanges and an adjacent end portion of a strut. Therein, the thickness of the spacer may be slightly thicker than the gap such that upon interposing the spacer, the spacer presses the end of the strut in the direction towards the laminate.

According to an embodiment, the spacer is made with an electrically conductive material.

In other words, the spacer may be made with or consist of an electrically conductive material such as a metal. Accordingly, the spacer may provide for an electric connection between the strut and the frame.

Accordingly, by e.g. pressing the spacer in the gap between an end of a strut and an adjacent second flange of the frame or by attaching the spacer in another manner to the frame such as to come into contact and push the strut towards the laminate, not only a mechanical pressure may be established onto the strut for supporting the laminate but also an electrical connection of the strut to the electrically grounded frame may be established.

According to an embodiment, the spacer may comprise at least one ridge pressed into the frame.

Such ridge may be provided in order to improve an electrical connection between the spacer and adjacent portions of the second flange of the frame on the one side, and adjacent portions of a strut, on the other side. A ridge may be a portion of the spacer which protrudes from a general surface of the spacer and which preferably forms a sharp edge or sharp tip.

Particularly it has been found that the frame and/or the strut may be made with aluminium which typically has an isolating oxide layer at its surface particularly if additionally anodised. Accordingly by simply mechanically contacting a surface of such aluminium components a reliable electric contact between such components and the spacer may not be established in all cases.

With the spacer comprising one or more ridges such ridges may be pressed into the surface of the frame particularly of its second flange upon the spacer being pressed in the gap between the second flange and the strut. Therein the ridge may be sharp-edged such as to enabling scratching of any oxide layer. Thereby, the ridge may penetrate any oxide layer thereby establishing a reliable electric connection. Ridges may be provided at the spacer on either or both of surfaces opposing the second flange of the frame on the one side and opposing the strut, on the other side. The ridge(s) may be an integral part of the spacer.

As an alternative to the spacer being interposed between the second flange of the frame and the strut, or in addition thereto, according to an embodiment, the spacer may be screwed to the frame.

Therein a screw may penetrate for example the second flange of the frame and/or the spacer thereby also penetrating any oxide layers at their surfaces. The screw may be of an electrically conductive material such as a metal. Accordingly, by such screwing, the spacer may not only be mechanically attached to the frame but may also be electrically connected to the frame.

According to an embodiment, the reinforcement strut may be glued to a rear surface of the laminate.

In other words, the reinforcement strut might not only be pressed towards the rear surface of the laminate due to an action of a spacer counter-pressing against portions of the frame but may also be directly fixed to the rear surface of the laminate by being glued to it.

Particularly, upon assembling the solar module, it may be beneficial to first attach the strut(s) to the rear surface of the laminate such that the laminate may then be handled together with the attached struts. Only then, the frame may be assembled and the struts may additionally be pressed towards the laminate by the spacers interacting with the frame.

The struts may be glued to the rear surface of the laminate using for example stripes made of silicone or made of an adhesive tape.

Upon optimising the mechanical characteristics of the solar module, it has been found that particularly a number of the reinforcement struts, a positioning of the reinforcement struts and/or a geometry and cross-section of the reinforcement struts may significantly influence a stability of the solar module.

Generally, one or more reinforcement struts could be arranged parallel to the longitudinal direction, parallel to the transversal direction, in a diagonal direction, etc. Furthermore, combinations of reinforcement struts extending in different directions may be possible. Accordingly, each option of reinforcement struts will mechanically support the outer profiles of the frame at specific location and influence e.g. deflection characteristics of the frame in specific ways.

According to an embodiment, the at least one reinforcement strut is arranged in parallel to a short edge of the frame, i.e. in the transversal direction of the module.

Typically, a solar module has a non-square rectangular geometry. While the struts may be, in principle, arranged in various orientations with respect to the frame, it has been found to be beneficial to arrange one or more struts in parallel to the short edges of the frame. In such arrangement, the struts may most efficiently support the solar module's stability. Furthermore, the struts may be shorter, thereby saving material costs and weight for the solar module.

Particularly, according to an embodiment, the solar module may comprise at least two, or more preferably exactly two, reinforcement struts arranged in parallel to each other.

While a single strut may already improve the solar module's stability, it has been found that, at typical dimensions of modern solar modules, arranging two struts in parallel to each other at the rear surface of the laminate may additionally improve the solar module's stability while not excessively increasing its weight. Of course, in principle, even more struts may be provided and would further slightly increase the solar module's stability. However, with three, four or even more struts, the weight of the solar module may increase excessively without significantly further improving its stability.

According to an embodiment, the reinforcement struts may have a rectangular cross-section.

Various different types of reinforcement struts have been tested or simulated upon being included in the proposed solar module. For example, reinforcement struts having an T-profile, an I-profile, a H-profile, a fl-profile, etc. have been investigated. It has been found that a reinforcement profile having a rectangular cross-section may provide a beneficial compromise between advantageous mechanical properties for the solar module, manufacturability and costs. Slight deviation from a strict rectangular cross-section such as rounded edges are acceptable.

It may be noted that possible features and/or benefits of embodiments of the present invention are described herein partly with respect to a solar module and partly with respect to a way of assembling such solar module. A person skilled in the art will understand that features described for embodiments of a solar module according to the invention may result in advantages in assembling such solar module, and vice versa. Furthermore, one skilled in the art will understand that features of various embodiments may be combined with or replaced by features of other embodiments and/or may be modified in order to come to further embodiments of the invention.

BRIEF DESCRIPTION OF THE DRAWINGS

In the following, embodiments of the invention will be described herein with reference to the enclosed drawings. However, neither the drawings nor the description shall be interpreted as limiting the invention.

The figures are only schematic representations and not true to scale. Same reference signs indicate same or similar features.

DESCRIPTION OF PREFERRED EMBODIMENTS

Figure 1:
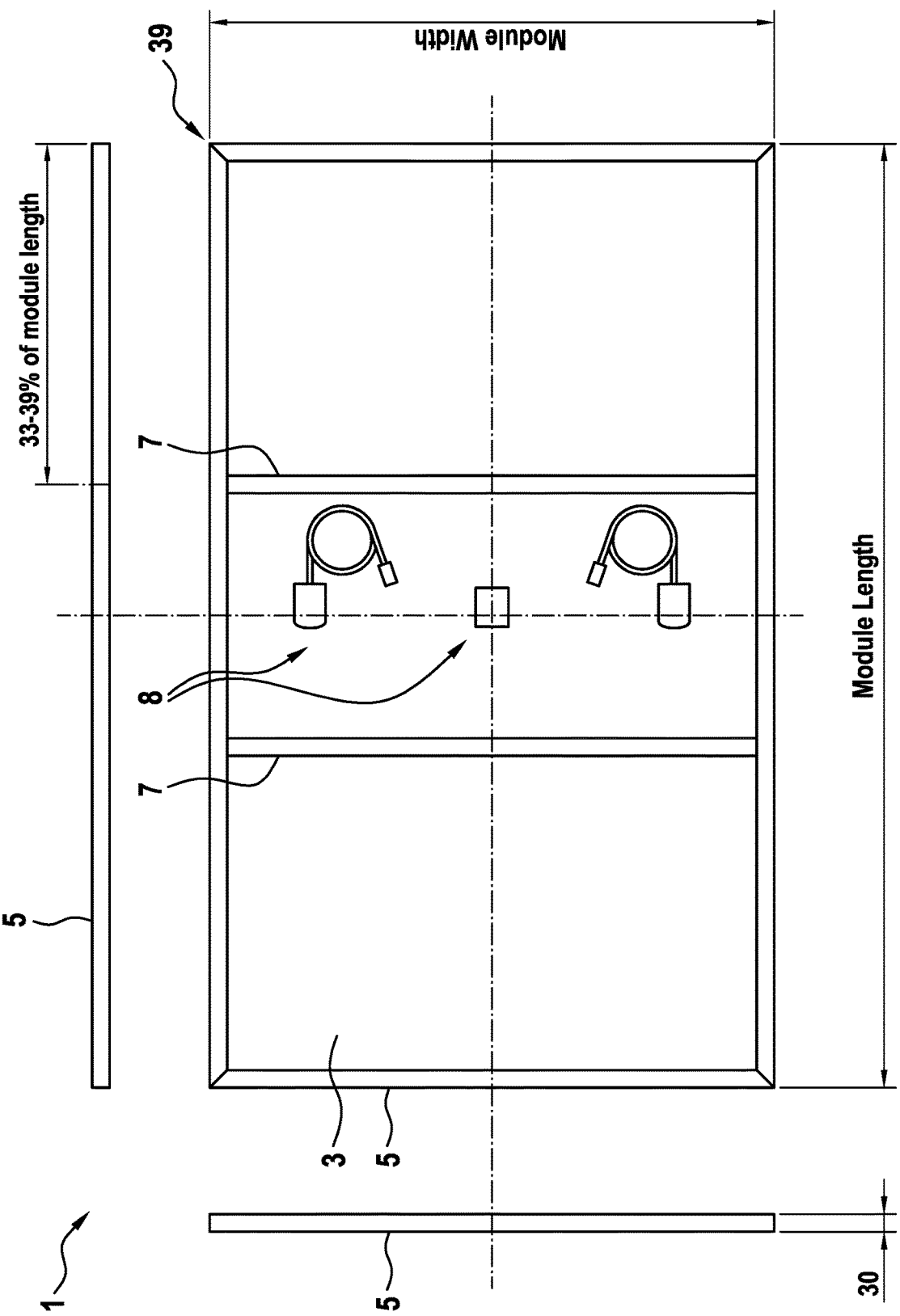
FIG. 1 shows a top view onto a rear side as well as side views from orthogonal sides onto a solar module according to an embodiment of the invention.

FIG. 1 shows a solar module 1 from different perspectives. The solar module 1 comprises a laminate 3, a frame 5 and two reinforcement struts 7. Furthermore, the solar module 1 comprises three junction boxes 8 including bypass diodes, with the outer two junction boxes 8 comprising external connection cables.

It is to be mentioned that dimensions and specific arrangements of the solar module 1 in FIG. 1 are only exemplary. For example, the module 1 may have different lateral dimensions and/or the struts 7 may be arranged at different locations. Furthermore, instead of the three junction boxes 8 as shown in FIG. 1, more or less junction boxes 8 may be provided. For example, only one junction box 8 may be arranged close to one of the long or short edges of the module 1.

Figure 2:
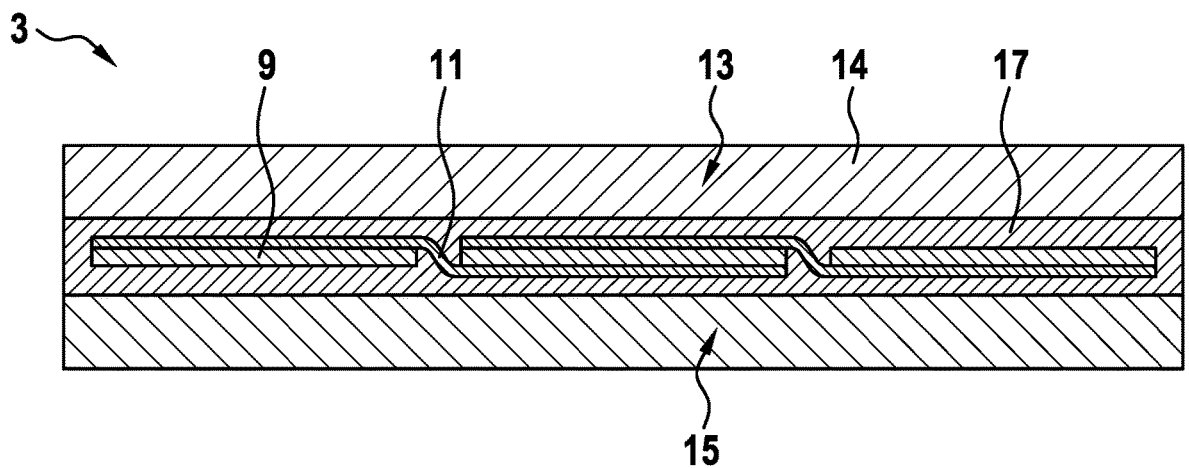
FIG. 2 shows a cross-section through a laminate of an inventive solar module.

As shown in FIG. 2, the solar laminate 3 comprises a plurality of solar cells 9. The solar cells 9 are connected by interconnectors 11 in a series and/or in parallel connections to form strings. The solar cells 9 are interposed between a transparent front cover sheet 13 and a rear cover sheet 15 with a remaining volume being filled with EVA 17. In the example shown, the laminate 3 comprises 60 solar cells 9 with a rectangular geometry, i.e. so-called half-cut solar cells, with a length of 156 mm and a width of 78 mm.

The frame 5 encloses the solar laminate 3 at its lateral edges. In the example shown, the solar module 1 with its frame 5 has conventional lateral dimensions with a length of 1665 mm and a width of 991 mm. There may be tolerances in these dimensions of ±2.5 mm.

Compared to conventional solar modules typically having a thickness of more than 38 mm, the solar module 1 proposed herein has a significantly smaller thickness of about 30 mm. This thickness of the solar module 1 is mainly represented by the thickness of the frame 5. Therein, after extensive optimisation efforts, it has been found that with a thickness of 30 mm, sufficient mechanical stability and strength may be provided for the solar module 1.

Furthermore, for example a weight of the solar module 1 may be reduced due to the fact that a front cover sheet 13 is used in which a glass sheet 14 has a reduced thickness of e.g. 3.05 mm or even only 2.8 mm, instead of conventional glass sheets with thicknesses of 3.2 mm or more.

Figure 3:
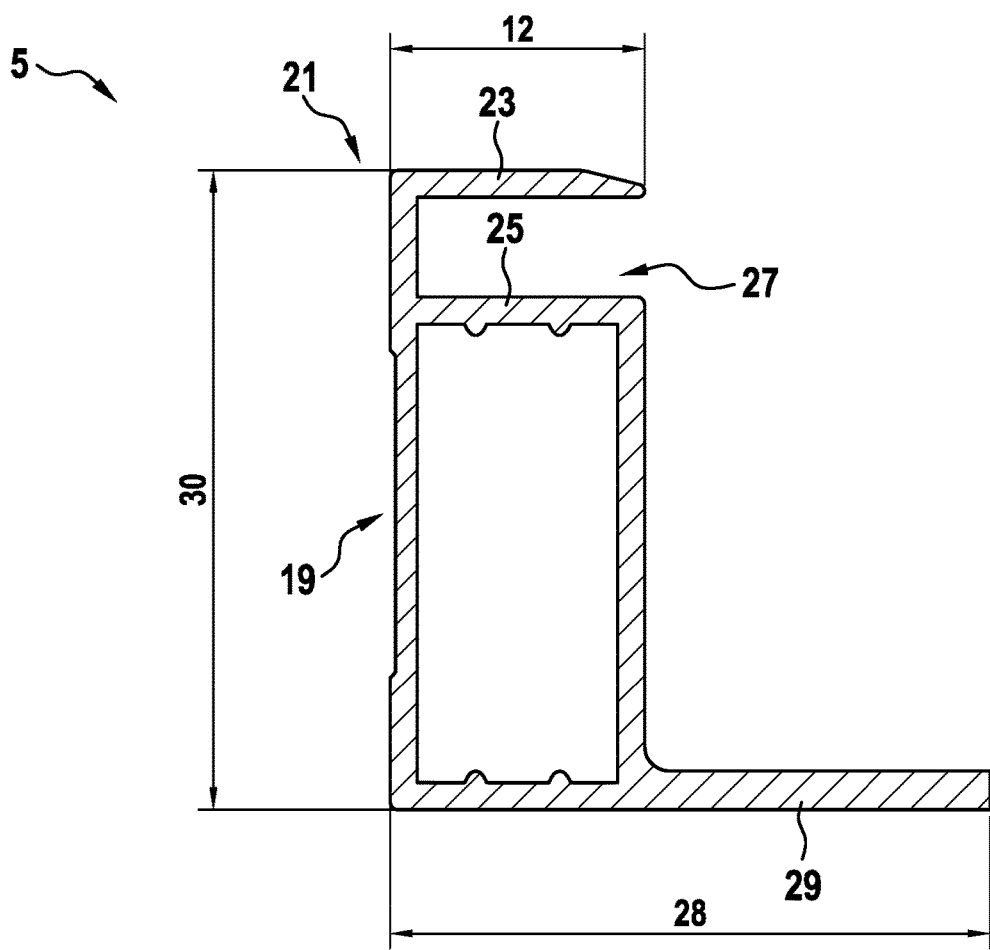
FIG. 3 shows a cross-section of a profile for a frame of an inventive solar module.

The frame 5 is composed of several elongate hollow profiles 19, as shown in the cross sectional view of FIG. 3. The hollow profiles 19 are linear and have a rectangular cross-section. A wall thickness is about 1.3 mm.

A first flange 21 extends from an upper part of the hollow profiles 19. This first flange 21 first extends in a height direction (i.e. vertically in the figure) of the hollow profile 19 and is then bent with its cantilever portion 23 orthogonally into a width direction (i.e. horizontally in the figure) such as to extend parallel to an upper wall 25 of the hollow profile 19. Thereby, the first flange 21 forms a clamping portion 27 for clamping the laminate 3 in between the cantilever portion 23 and the upper wall 25. The clamping portion 27 has a height in the height direction corresponding to or being slightly wider than the thickness of the laminate 3. Accordingly, the laminate 3 may be inserted into the clamping portion 27 and may be fixed therein using for example an adhesive.

A second flange 29 extends from a lower part of the hollow profile 19 in the width direction of the hollow profile 19 towards a centre of the frame 5.

The entire hollow profile 19 including its first and second flanges 21, 29 may be made with a metal such as aluminium and may be made as integral parts for example by extrusion. Exemplary dimensions are given in the figure.

Figure 4A:
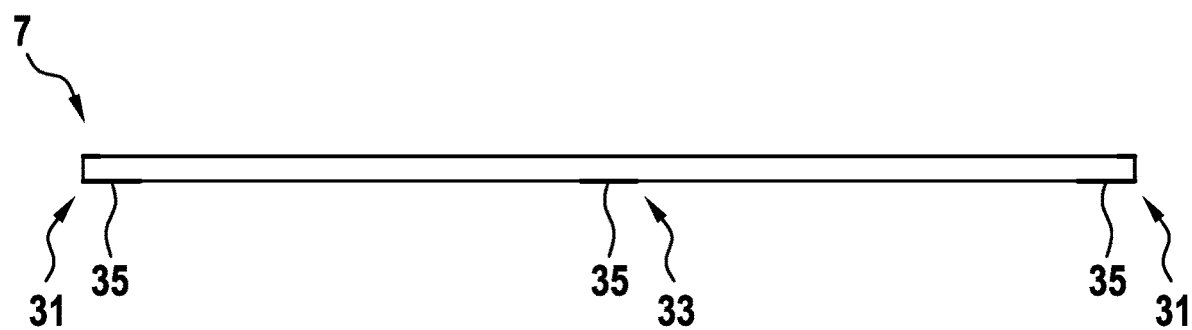
FIG. 4a, b show a side view and a bottom view onto a strut of an inventive solar module.
Figure 4B:
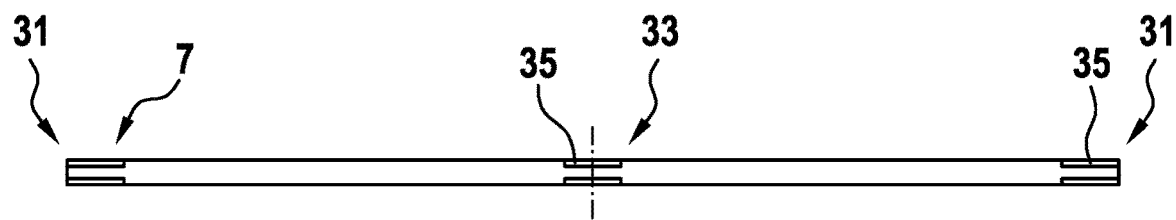

As shown in FIGS. 4a,b, the struts 7 may be elongate profiles with for example rectangular cross-section and preferably being made with a metal such as aluminium. The struts 7 may be arranged in parallel to the short edges of the rectangular laminate 3 and at a distance of 600 mm therefrom. Such orientation and positioning of the struts 7 has been found to provide optimized mechanical characteristics for the solar module. A height of the struts 7 in a thickness direction may be for example 20 mm and a width may be 22.55 mm. At end regions 31 as well as at a centre region 33, bond line control strips 35 are provided. Such bond line control strips 35 may be tape strips with a length of e.g. 50 mm, a width of 6 mm and a height of 1 mm.

Figure 5:
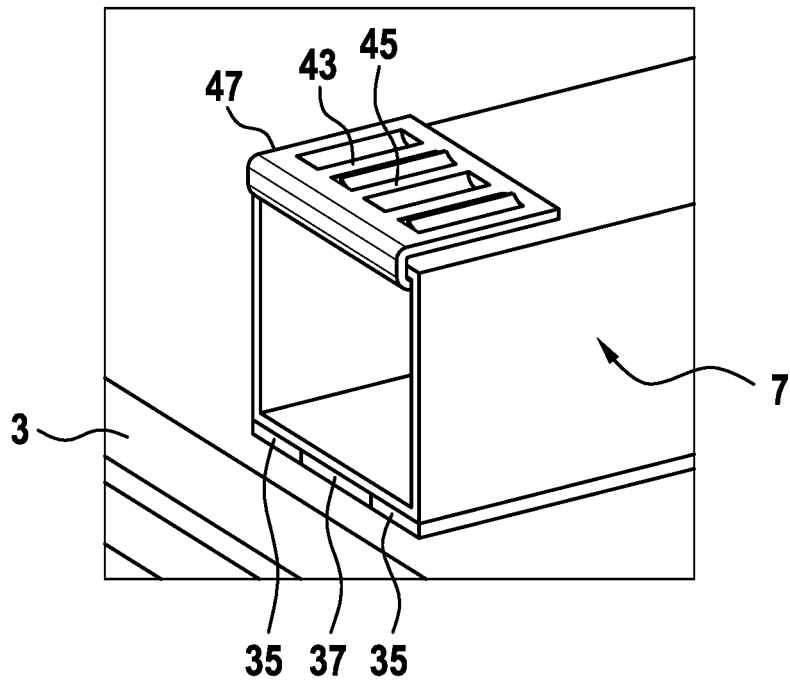
FIG. 5 shows a perspective view onto a strut fixed on a laminate of an inventive module.

As shown in FIG. 5, upon assembling the solar module 1, the struts 7 may be glued to a rear side of the laminate 3 using for example silicone. Therein, the bond line control strips 35 may determine a thickness of a silicone glue layer 37. Thereby, a position of the struts 7 with respect to the rear surface of the laminate 3 may be precisely determined.

After the struts 7 being glued to the laminate 3, the frame 5 may be assembled. For this purpose, the clamping portions 27 may be pressed in a lateral direction onto edge regions of the laminate 3 such that the laminate 3 is clamped in the clamping portions 27. Furthermore, pre-crimped corner keys may be inserted in the hollow profiles 19 at corners 39 (see FIG. 1) where ends of neighbouring hollow profiles 19 adjoin to each other in a rectangular way, thereby electrically connecting these parts of the frame 5 and providing for mechanical stability.

While the laminate 3 are directly pressed into a clamping configuration into the clamping portions 27, the struts 7 are arranged with a gap 41 being present between a rear side of the struts 7 and an opposing side of the second flange 29 of the hollow profile 19. Upon assembling the solar module 1, this gap 41 is bridged with a spacer element 43. Therein, the spacer element 43 is adapted and cooperates with the frame 5 such that it pushes the strut 7 in a direction towards the laminate 3.

Figure 6:
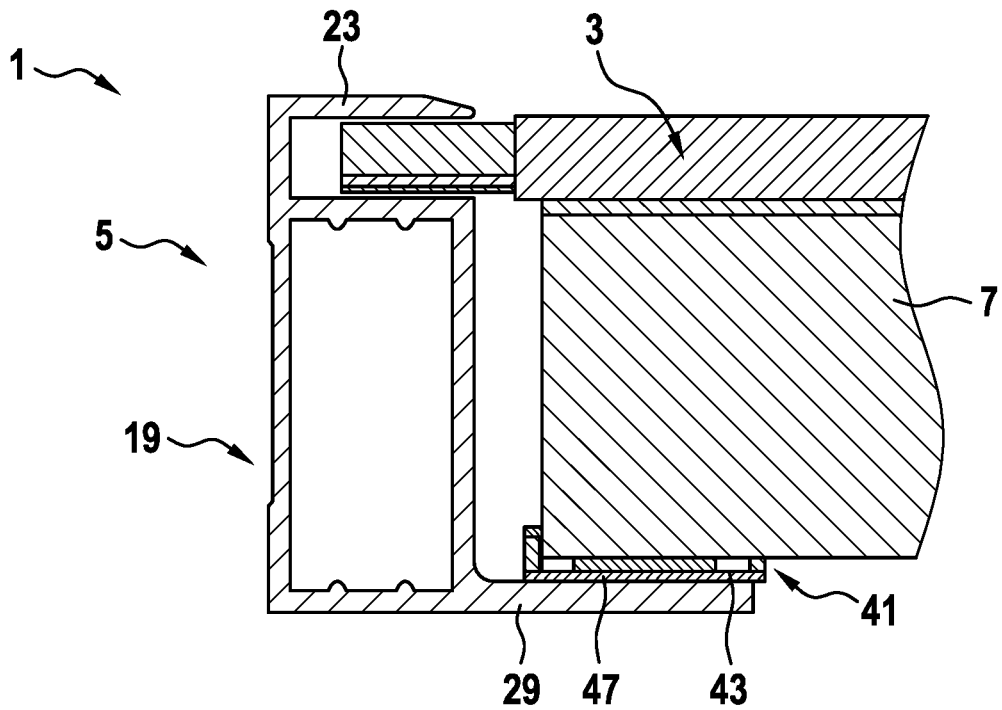
FIG. 6 shows a cross-section view through a frame on an inventive solar module.

In the example shown in FIGS. 5 and 6, the spacer element 43 is made with a metal sheet which has been bent into a Li-shape. An inner leg of this Li-shaped spacer element 43 is inserted into the interior volume of the strut 7 and an outer leg 47 is thereby arranged at an outer surface of the strut 7. Thereby, the struts 7 are pressed in a direction towards the laminate 3 as the outer leg 47 of the spacer element 43 is slightly thicker than the gap 41.

Furthermore, ridges 45 are provided at the spacer element 43 at the outer leg 47, these ridges 45 protruding in a direction towards the second flange 29. Accordingly, upon pressing the hollow profile 19 of the frame 5 onto the strut 7, these ridges 45 may scratch away any oxide layer on top of the aluminium of the second flange 29, thereby establishing a reliable electric contact between the frame 5 and the struts 7.

Figure 7:
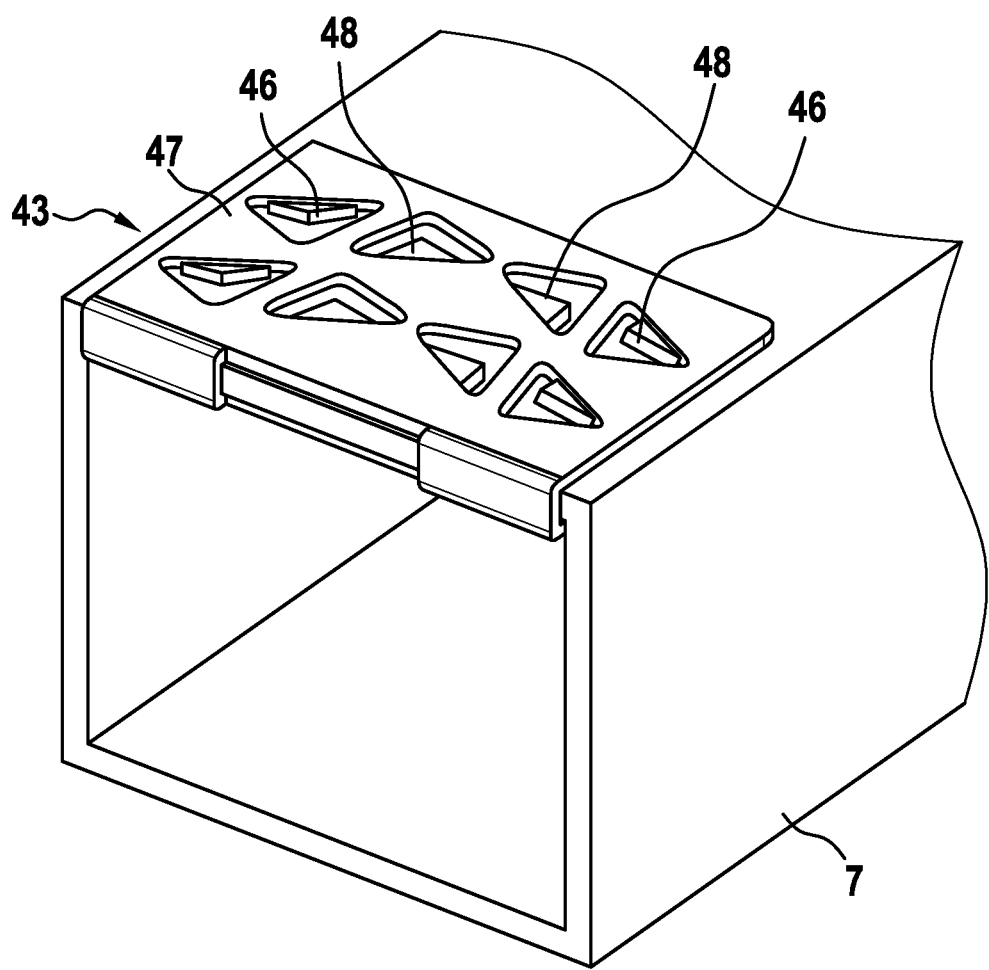
FIG. 7 shows a perspective view onto another strut with a spacer element for an inventive module.

FIG. 7 shows another exemplary strut 7 with a specifically designed spacer element 43. Therein, similar to the example of FIG. 5, the spacer element 43 is again made with a metal sheet which has been bent into a U-shape and is provided with an inner leg which is inserted into the interior volume of the strut 7. An outer leg 47 of the spacer element 43 is arranged at an outer surface of the strut 7 and comprises triangular noses 46 protruding away from the strut 7, i.e. towards the second flange 29, as well as triangular noses 48 protruding in an opposite direction, i.e. towards the strut 7. Both types of noses 46, 48 have a sharp edge or pointed tip at their most protruding area. Accordingly, upon pressing the hollow profile 19 of the frame 5 onto the strut 7, these protruding noses 46, 48, 45 may scratch away any oxide layer on top of the aluminium of the second flange 29, thereby establishing a reliable electric contact between the frame 5 and the struts 7.

Figure 8:
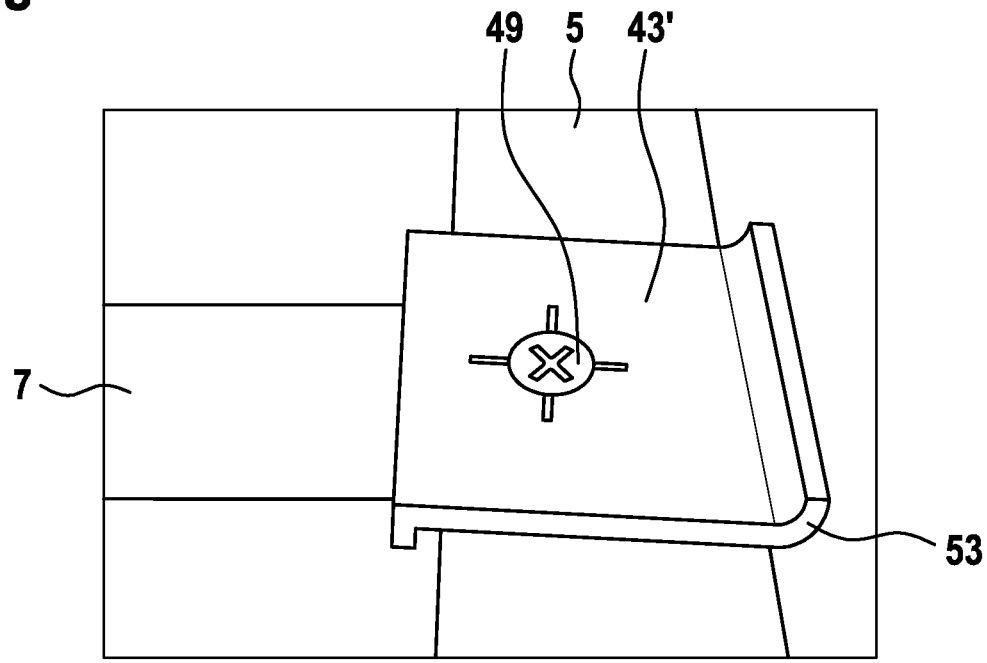
FIG. 8 shows a perspective view onto a spacer arrangement of an inventive solar module.
Figure 9:
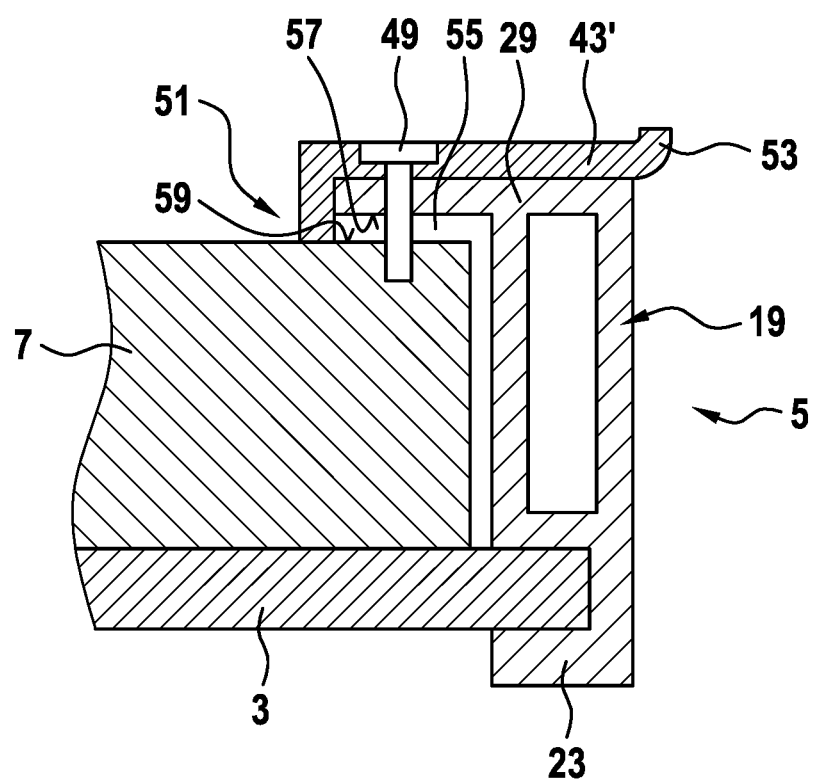
FIG. 9 shows a cross-section view through the spacer arrangement of FIG. 8.

FIGS. 8 and 9 show an alternative example for pressing the strut 7 in a direction towards the laminate 3. In this example, a spacer element 43' is attached to the frame 5 using a screw 49. The screw 49 reaches down into the strut 7 and thereby establishes an electrical connection between the strut 7 and the frame 5. A threading of the screw 49 may engage with the material of the strut 7. The screw 49 may be flush countersunk with an upper surface of the second flange 29.

Therein, the spacer elements 43' has an end portion 51 at an end directed towards the center of the module, this end portion 51 being bent into a downward direction towards the strut 7. Accordingly, by screwing the spacer element 43' to the frame 5, this end portion 51 is pressed against the rear side of the strut 7, thereby pushing the strut 7 towards the laminate 3. A small gap 55 may be kept between a lower surface 57 of the second flange 29 and an opposing upper surface 59 of the strut 7.

Furthermore, the spacer elements 43' has an opposite end portion 53 at an end directed away from the center of the module. This opposite end portion 53 is bent in a rounded configuration in an upward direction. Thereby, the opposite end portion 53 may serve as a spacer for spacing neighbouring modules upon the modules being stacked over each other e.g. during shipping.

Figure 10:
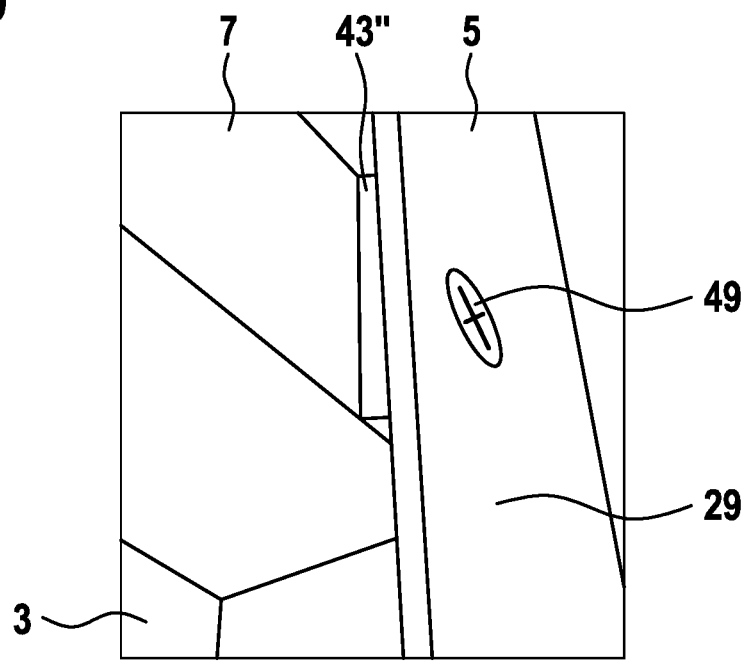
FIG. 10 shows a perspective view onto a spacer arrangement of another inventive solar module.
Figure 11:
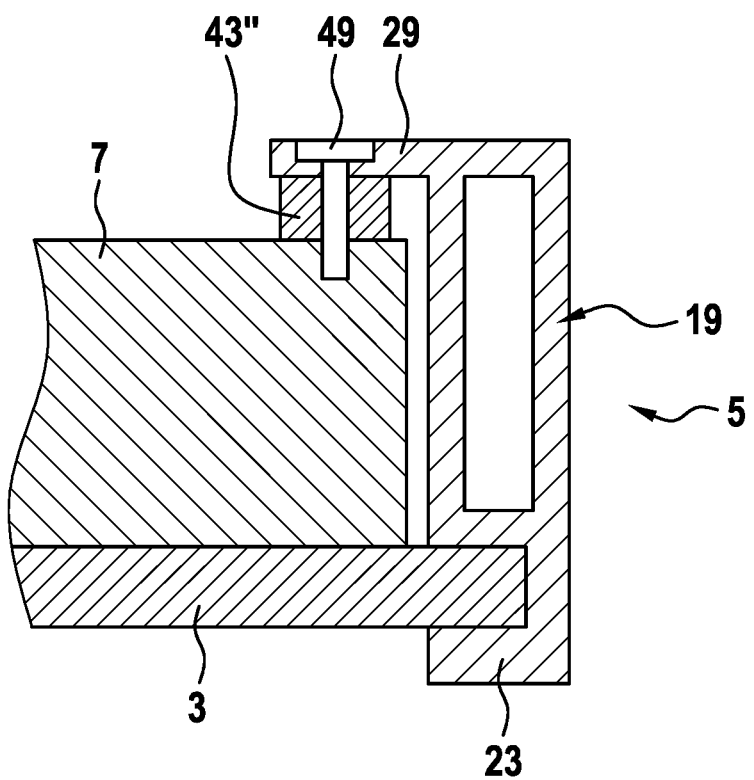
FIG. 11 shows a cross-section view through the spacer arrangement of FIG. 10.

FIGS. 10 and 11 show another alternative example for pressing the strut 7 in a direction towards the laminate 3. In this example, a spacer element 43" is arranged between the second flange 29 of the hollow profile 19 of the frame 5 and a rear side of the strut 7. The spacer element 43" is screwed with a screw 49 to the second flange 29.

In the examples of FIGS. 8-11, the screw 49 may penetrate any electrically isolating oxide layer, thereby reliably electrically interconnecting the frame 5 with the spacer element 43, finally establishing an electrical interconnection between the frame 5 and the strut 7.

Summarizing, a solar module 1 with a reduced thickness is proposed. Due to the reduced thickness of e.g. only 30 mm, as compared to conventional solar modules having typically more than 38 mm, the solar module 1 has a reduced volume which is beneficial, inter alia, during transport of the module 1 to a destination location. However, the thickness has been optimized to, in combination with the reinforcement struts 7, still providing for sufficient mechanical stability for the solar module 1.

Finally, it should be noted that terms such as "comprising" do not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS 1 solar module
3 laminate
5 frame
7 strut
8 junction boxes
9 solar cell
11 interconnectors
13 front cover sheet
14 glass sheet
15 rear cover sheet
17 EVA
19 hollow profile
21 first flange
23 cantilever portion
25 upper wall of hollow profile
27 clamping portion
29 second flange
31 end regions
33 centre regions
35 bond line control strips
37 glue
39 corner of frame
41 gap
43 spacer element
45 ridges
46 nose protruding away from strut
47 outer leg of spacer element
48 nose protruding towards strut
49 screw
51 end portion of spacer element
53 opposite end portion of spacer element
55 gap
57 lower surface of the second flange
59 upper surface of the strut

The invention claimed is:

1. A solar module comprising:
a solar laminate comprising a plurality of solar cells interposed between a transparent front cover sheet and a rear cover sheet;
a frame enclosing the solar laminate at lateral edges of the solar laminate;
a reinforcement strut arranged at a rear surface of the solar laminate between opposing portions of the frame;
a spacer element cooperating with the frame so as to push the reinforcement strut in a direction towards the laminate; and
wherein the frame has a frame surface and a frame thickness, the frame surface being defined by a length of the frame multiplied by a width of the frame;
wherein a ratio between the frame surface and the frame thickness is between 45000 and 70000, with dimensions of the frame being measured in millimetres;
wherein the spacer element and the reinforcement strut comprises two separate and non-integral elements;
wherein the spacer element is made with an electrically conductive material; and
wherein the spacer element comprises at least one ridge which protrudes towards the frame or towards the reinforcement strut to scratch an electrically isolating oxide layer at a surface of the frame or the reinforcement strut and to thereby establish an electrical connection between the frame and the reinforcement strut wherein the spacer element comprises a planar surface facing the frame or reinforcement strut, and wherein the ridge protrudes from the planar surface towards the frame or towards the reinforcement strut.

2. The solar module of claim 1, wherein the at least one ridge forms a sharp edge or sharp tip.

3. The solar module of claim 1, wherein the at least one ridge comprises a triangular nose towards the frame or towards the reinforcement strut.

4. The solar module of claim 1, wherein the at least one ridge is at a non-perpendicular angle relative to the frame or the reinforcement strut.

5. The solar module of claim 1, wherein the spacer element comprises:
a first ridge which protrudes from the spacer element towards the frame; and
a second ridge which protrudes from the spacer element towards the reinforcement strut.

6. The solar module of claim 1, wherein the frame has a thickness of less than 35 mm.

7. The solar module of claim 1, wherein the frame has a length of $1665 \pm x$ mm, a width of $991 \pm y$ mm and a thickness of $30 \pm z$ mm, with x, y, z being tolerances with x<5 mm, y<5 mm and z<2 mm.

8. The solar module of claim 1, wherein the front cover sheet comprises a glass sheet with a thickness of between 2.7 mm and 3.1 mm.

9. The solar module of claim 1, wherein the reinforcement strut is electrically connected to the frame.

10. The solar module of claim 1, the frame comprising elongate hollow profiles with a first flange extending from an upper part of the hollow profile thereby forming a clamping portion for clamping the laminate between the first flange and the hollow profile and a second flange extending from a lower part of the hollow profile in a direction towards a centre of the frame.

11. The solar module of claim 10, wherein ends of the reinforcement strut are interposed between the laminate and the second flange of the frame.

12. The solar module of claim 11, wherein a spacer element is interposed between an end of the reinforcement strut and the second flange of the frame.

13. The solar module of claim 1, wherein the spacer element comprises at least one ridge pressed into the frame thereby establishing the electrical connection between the frame and the reinforcement strut.

14. The solar module of claim 1, wherein the spacer element is screwed to the frame.

15. The solar module of claim 1, wherein the reinforcement strut is glued to a rear surface of the laminate.

16. The solar module of claim 1, wherein the reinforcement strut is arranged in parallel to a short edge of the frame.

17. The solar module of claim 1, further comprising a second reinforcement struts arranged in parallel to the reinforcement strut.

18. The solar module of claim 1, wherein the reinforcement strut has a rectangular cross-section.

\* \* \* \* \*